United States Patent
Cech

[11] Patent Number: 5,226,673
[45] Date of Patent: Jul. 13, 1993

[54] BRAKING ASSEMBLY AND METHOD

[76] Inventor: Donald E. Cech, 1736 Collyer Ct., Longmont, Colo. 80501

[21] Appl. No.: 753,318

[22] Filed: Aug. 30, 1991

Related U.S. Application Data

[63] Continuation-in-part of Ser. No. 608,849, Nov. 5, 1990, abandoned.

[51] Int. Cl.⁵ .............................................. A63C 17/14
[52] U.S. Cl. .................................. 280/11.2; 188/2 D; 188/29; 188/71.1; 188/72.7; 188/72.9; 188/74; 188/70 R; 280/11.22; 301/5.3
[58] Field of Search ................ 280/11.2, 11.22, 11.19, 280/11.23, 11.27; 188/2 R, 29, 74, 70 R, 71.1, 72.9, 72.7, 2 D, 3 R, 72.1, 72.8; D21/226; 301/5.3

[56] References Cited

U.S. PATENT DOCUMENTS

| | | | |
|---|---|---|---|
| 285,783 | 10/1883 | Ballou | 301/5.3 |
| 285,836 | 10/1883 | Otis | 301/5.3 |
| 982,846 | 1/1911 | Nesbitt, Sr. | 280/11.2 |
| 1,609,612 | 12/1926 | Eskeland | 280/11.22 |
| 1,882,173 | 10/1932 | Blake | 188/72.9 X |
| 1,925,233 | 9/1933 | Cremer | 188/72.9 |
| 1,928,743 | 10/1933 | Sneed | 188/72.9 |
| 2,644,692 | 7/1953 | Kahlert | 280/11.2 X |
| 3,871,672 | 3/1975 | Bardy . | |
| 3,904,215 | 9/1975 | Bardy . | |
| 4,076,266 | 2/1978 | Krausz | 280/11.2 X |
| 4,134,599 | 1/1979 | DiMille et al. | 188/72.7 X |
| 4,295,547 | 10/1981 | Dungan | 280/11.2 X |
| 4,300,781 | 11/1981 | Riggs | 280/11.2 |
| 4,417,737 | 11/1983 | Suroff | 280/11.2 X |
| 4,633,979 | 1/1987 | Edwards | 188/72.7 |
| 4,706,974 | 11/1987 | Vincent | 280/11.2 X |
| 4,805,743 | 2/1989 | Rains | 188/107 X |

FOREIGN PATENT DOCUMENTS 143245 8/1903 Fed. Rep. of Germany ..... 280/11.2

Primary Examiner—Douglas C. Butler
Attorney, Agent, or Firm—Harold A. Burdick

[57] ABSTRACT

A braking assembly and method are disclosed for use with wheeled skating apparatus having a plurality of wheels rotatably connected with a support structure, the assembly including a band of relatively resilient material positioned at the outer circumference of a selected one of the plurality of wheels, a mount securable adjacent to the support structure, and a brake pad movably connected with the mount and positioned adjacent to the selected wheel for selectively contacting a surface associated with, and preferably in, the selected wheel. An actuator is operatively associated with the brake pad for selectively causing the pad to contact the surface.

18 Claims, 4 Drawing Sheets

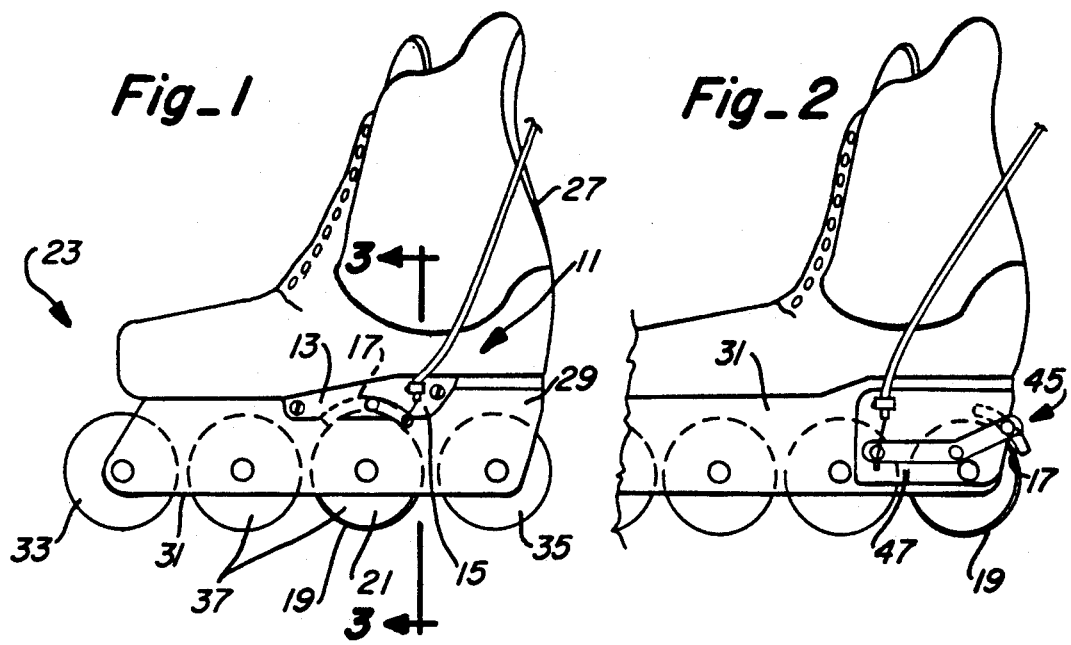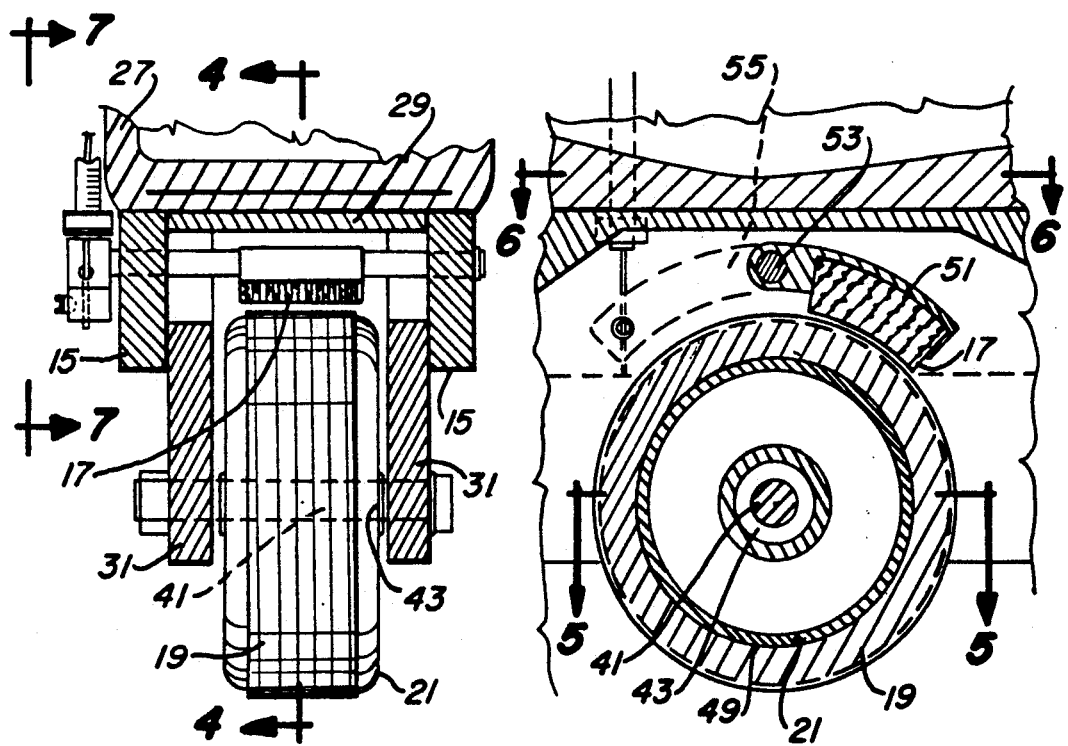

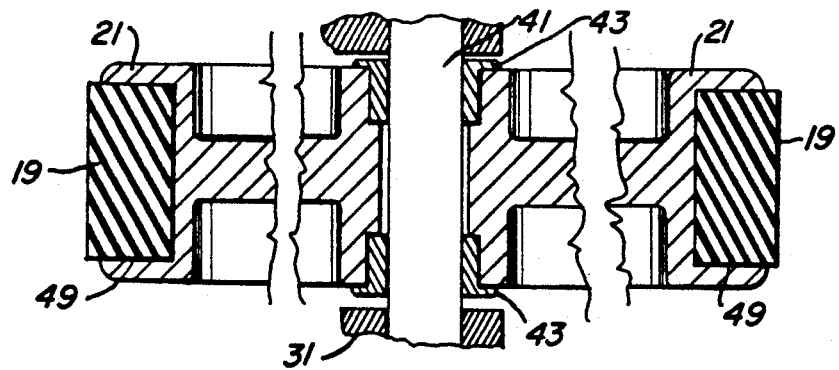
Fig_5
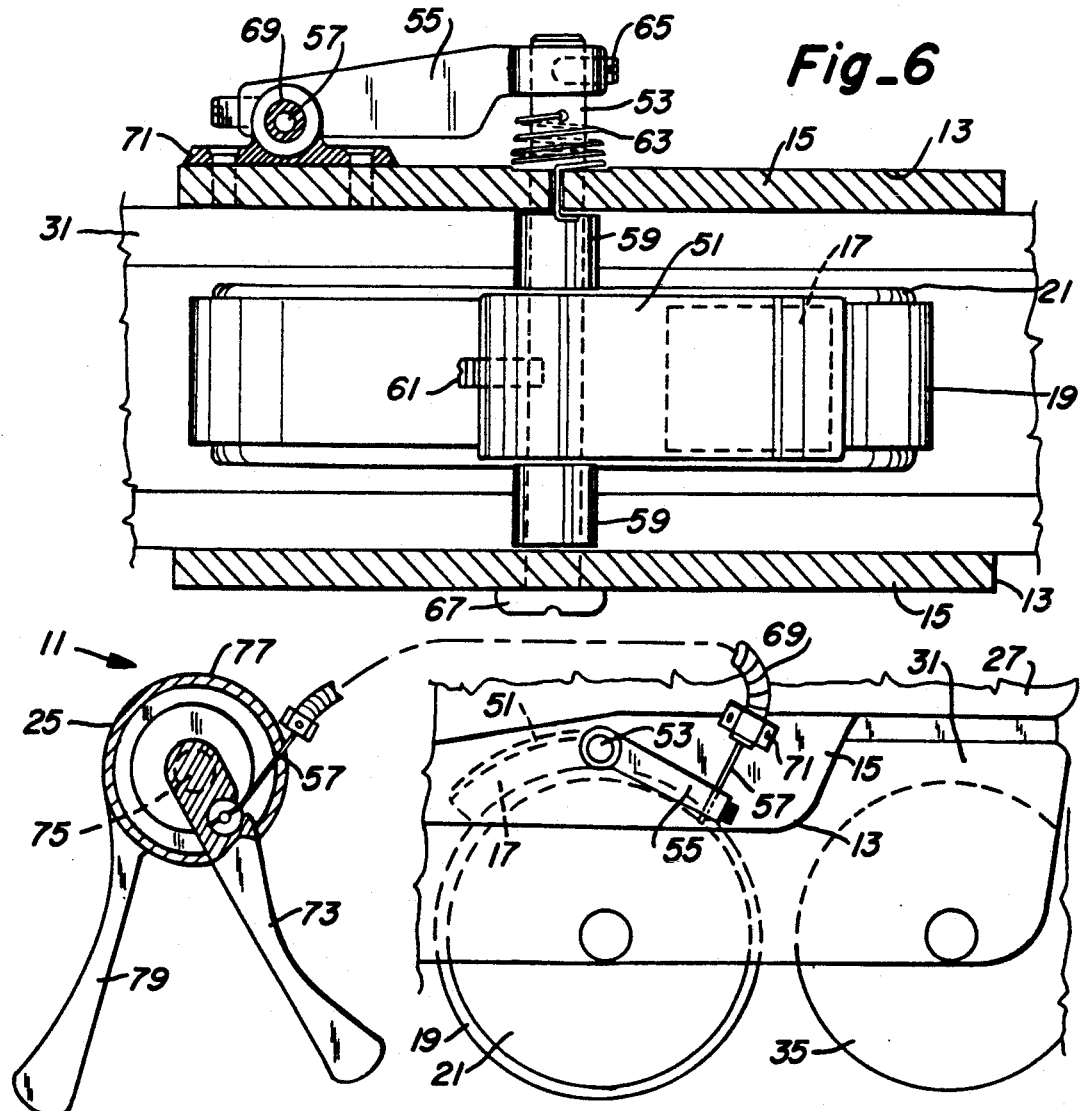
Fig_6
Fig_7

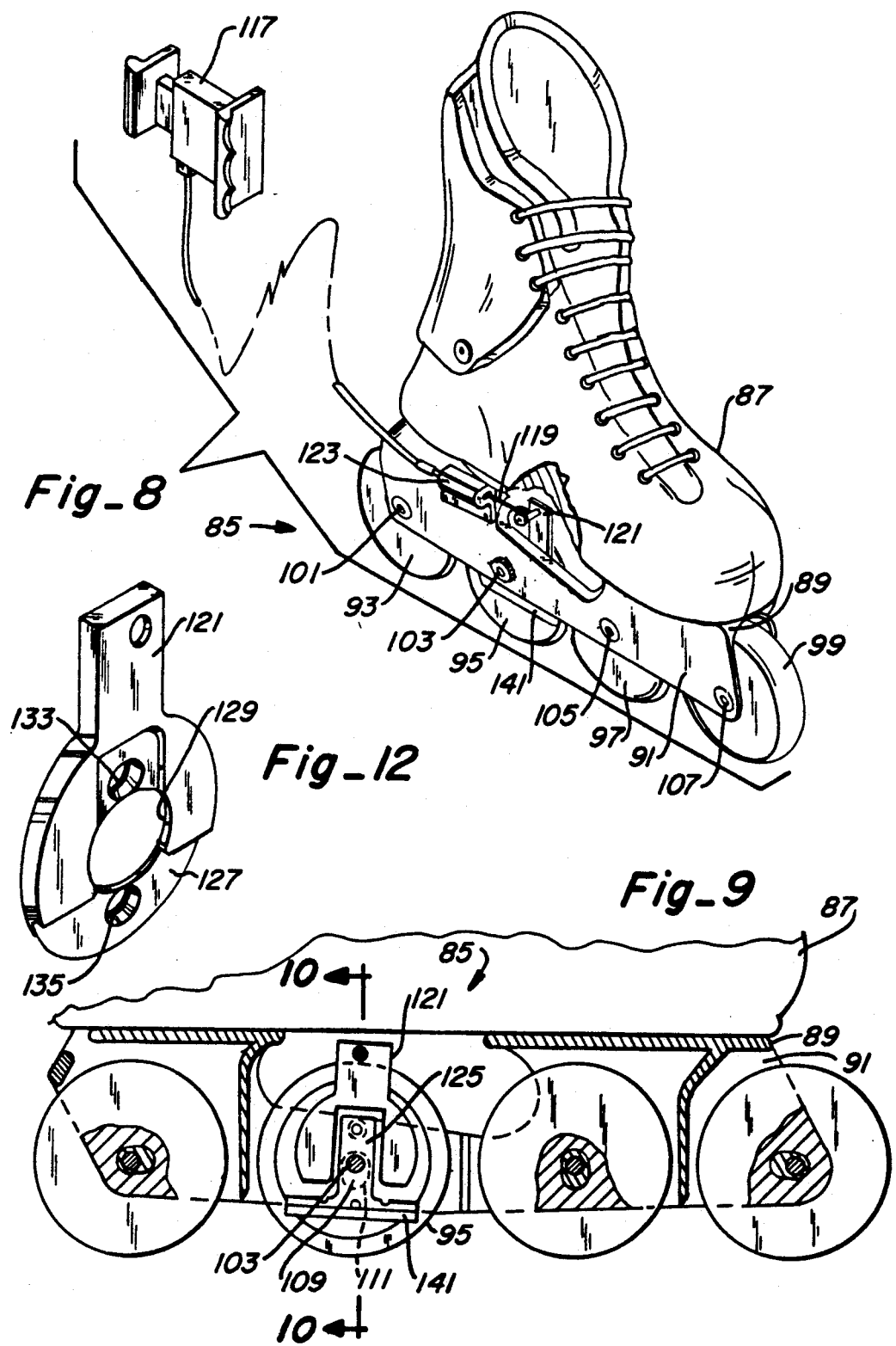

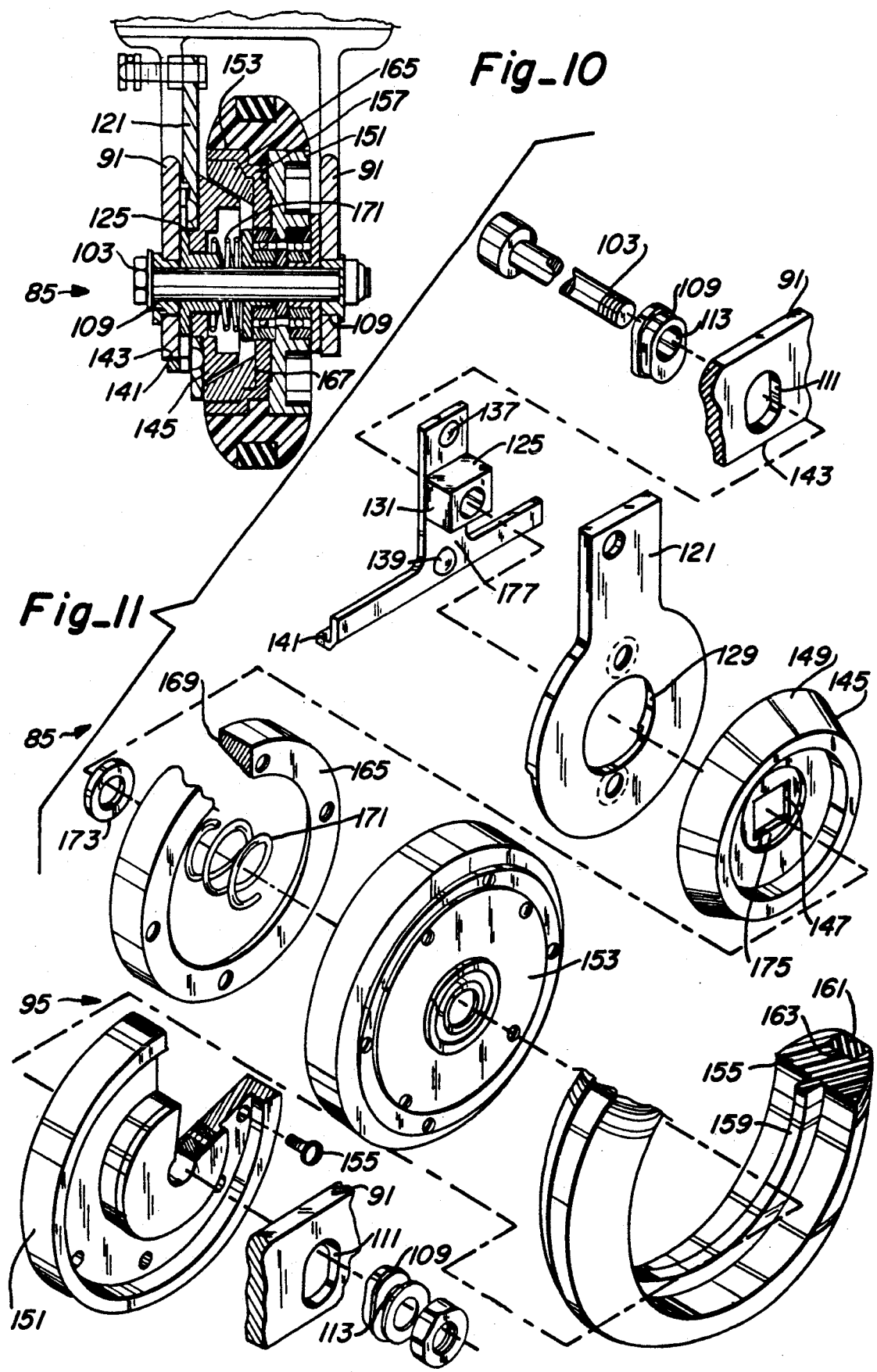

BRAKING ASSEMBLY AND METHOD

RELATED APPLICATION

This application is a continuation-in-part of pending U.S. patent application Ser. No. 608,849 filed Nov. 5, 1990, Entitled "BRAKING ASSEMBLY AND METHOD", which application is now abandoned.

FIELD OF THE INVENTION

This invention relates to braking assemblies, and, more particularly, relates to braking assemblies for wheeled skating apparatus.

BACKGROUND OF THE INVENTION

Braking systems for utilization with skate-type wheels and/or castors have been heretofore known and/or utilized (see for example U.S. Pat. Nos. 4,076,266, 4,094,524, 4,183,546, 4,300,781, 4,706,974, 4,691,931, 4,602,801, 2,140,955, 4,275,895, 2,139,699, 2,707,794, 2,685,351, and 4,943,075). However, stopping speed and control have not always proven to be entirely satisfactory in some applications of such systems, and ease of application (where, for example, such system is to be retrofit in a particular application) and/or ease of replacement of worn parts has not always been given due consideration.

Skates having a linearly arranged set of wheels have also been heretofore known (see for example U.S. Pat. Nos. 3,823,952, 28,509, 2,570,349, 2,145,219, 480,610, and 2,048,916). Such "in-line" skates have gained recently in popularity and have thus been found by many to have a drawback in that they are difficult to safely slow or stop. In-line skates in some cases employ a heel or toe piece of rubber material for slowing or stopping the skate when a user drags the piece on the skating surface. Use of such toe or heel pieces is difficult to master even for the experienced skater, and particularly so on uneven or heavily used skate paths. One arrangement has shown an actuatable brake for such in-line skates, but this arrangement again requires a particular skate maneuver in order to activate the brake (see European Application Number 379,906-A). Braking systems particularly adapted for such wheeled skates having linearly arranged sets of wheels have thus not been heretofore entirely satisfactory.

While rollers for skates have heretofore included composite roller surfaces for stability, to prevent sliding, and the like (see for example U.S. Pat. Nos 320,774, 1,548,631, 285,783, 281,324, and 285,836) their use has been substantially obviated by more recent roller materials, such as polyurethanes or other relatively rigid materials, for such purposes. Utilization of a modified roller surface in conjunction with a braking mechanism has not been apparently heretofore suggested to thus provide improved stopping ability and stability of wheeled apparatus to which such a system is applied.

SUMMARY OF THE INVENTION

This invention provides an improved braking assembly and method for application to wheeled apparatus having a plurality of wheels, each wheel having a diameter and being rotatably connected with a support structure.

The braking assembly includes a relatively resilient material band applied to at least one of the wheels at an outer circumference thereof. The band, and/or the wheel, may preferably have dimensions selected so that when applied the diameter of the wheel together with the band is greater than the overall diameter of any of the other wheels.

A mount is provided for securement to the support structure, and a brake pad is movably connected with the mount and adjacent to the selected wheel. An actuator operatively associated with the brake pad selectively causes contact between the pad and the wheel, preferably with the band or with a pad contacting structure position at an inner part of the selected wheel.

The braking assembly may be provided independently of the wheeled apparatus (for example as a kit) or may be provided as original equipment on the wheeled apparatus, and is particularly well adapted for use with skate-type apparatus to improve stopping and/or slowing speed and control. Worn parts (the band, contacting structure, and/or pad) may be easily replaced.

It is therefore an object of this invention to provide an improved braking assembly and method for utilization with wheeled apparatus having a plurality of wheels formed of relatively rigid material.

It is another object of this invention to provide a braking assembly and method wherein a brake pad engages an inner part of a skate-type wheel to effect braking.

It is another object of this invention to provide a braking assembly for wheeled apparatus which includes a relatively resilient material band applied to at least one wheel of the apparatus at an outer circumference thereof, the band having dimensions selected so that when applied the diameter of the wheel together with the band is greater than the diameter of any one of the plurality of wheels without the band, a mount securable to a support structure of the wheeled apparatus, a brake pad movably connected with the mount and adjacent to the band, and an actuator operatively associated with the brake pad for selectively causing contact between the pad and the band.

It is still another object of this invention to provide a braking assembly for an apparatus having a plurality of wheels wherein one of the wheels has a surface engaging material band which is resilient relative to the surface engaging material applied to the other wheels.

It is another object of this invention to provide a wheeled apparatus having a support structure, a plurality of wheels each having a diameter and being rotatably connected with the support structure substantially in a line, a mount securable adjacent to the support structure, a brake pad movably connected with the mount, a contacting structure positioned adjacent to an inner part of one of the wheels, and an actuator operatively associated with the brake pad for selectively causing the pad to contact the contacting structure.

It is another object of this invention to provide a method for providing braking of wheeled skating apparatus having a plurality of wheels, each wheel having a diameter and being connected with a support structure, the method comprising the steps of movably mounting a brake pad adjacent to the support structure, mounting a pad contacting structure adjacent to an inner part of one of the wheels, and operatively associating actuating means with the brake pad for selectively causing contact between the pad and the contacting structure.

It is yet another object of this invention to provide a braking assembly and method for utilization with wheeled skates having a single linearly arranged set of wheels which improves stopping speed and/or stability.

It is still another object of this invention to provide an improved braking assembly and method for utilization with wheeled apparatus having a plurality of wheels formed of relatively rigid material which is provided for either retrofitting with the wheeled apparatus or as original equipment thereon.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a side view of a first embodiment of the braking assembly of this invention when utilized in conjunction with a skate having a single linearly arranged set of wheels;

FIG. 2 is a partial side view of the braking assembly as illustrated in FIG. 1 with mounting for activation of a different one of the plurality of wheels;

FIG. 3 is a sectional view taken through section lines 3—3 of FIG. 1;

FIG. 4 is a sectional view taken through section lines 4—4 of FIG. 3;

FIG. 5 is a sectional view taken through section lines 5—5 of FIG. 4;

FIG. 6 is a sectional view taken through section lines 6—6 of FIG. 4;

FIG. 7 is an illustration of the braking assembly of this invention including a hand held brake actuator;

FIG. 8 is a perspective view of a second, and now preferred, embodiment of the braking assembly of this invention;

FIG. 9 is a partial side view of the assembly of FIG. 8 with portions cut away;

FIG. 10 is a sectional view taken through section line 10—10 of FIG. 9;

FIG. 11 is an exploded view of the braking assembly of FIG. 8; and

FIG. 12 is a perspective view of the actuating arm of the assembly.

DESCRIPTION OF THE INVENTION

A preferred embodiment of the braking assembly of this invention for utilization with a skate having a single set of linearly arranged wheels (also known by the trademark name "Rollerblades ™") is illustrated in FIG. 1. It should be understood that the braking assembly of this invention, while illustrated with a skate, is utilizable with any wheeled apparatus having a plurality of wheels formed of a relatively rigid material such as hard plastics, aluminum, wood, steel or the like (such as roller skates, skateboards, rolling pallets, benches, and other systems employing castors).

As illustrated in FIGS. 1 and 2 through 7, brake assembly 11 includes mounting assembly 13 having mounting plate 15, brake pad 17, relatively resilient material band 19 applied to selected wheel 21 of skate 23, and actuator 25.

The skate to which braking assembly 11 is applied typically includes an article of footwear (such as shoe, or boot, 27), connected with support structure 29 including a wheel framework 31 having forward wheel 33, rearward wheel 35 and one or more middle wheels 37 (including selected wheel 21) rotatably connected thereto.

As illustrated in FIGS. 3 through 5, with particular reference to selected wheel 21, the wheels are mounted to wheel framework 31 conventionally utilizing axle 41 and bearings 43.

FIG. 2 illustrates a second embodiment 45 of the braking assembly of this invention for application to the rear wheel of a linearly arranged set of wheels. The embodiment illustrated in FIG. 2, however, employs a substantially similar set of components as that illustrated in FIG. 1 and hereinafter described, with the primary distinction being the configuration of mounting plate 47 which is generally required to be directly attached to wheel framework 31.

The overall braking assembly is best illustrated in FIG. 3 through 7. Relatively resilient band 19 (formed, for example, of any suitable rubber or rubber-like material capable of regaining its shape after compression, stretching or flexion, and having a durometer selected for the load to be born in the particular application, for example a 50 to 65 durometer material for use with skates, depending on weight) is positioned in circumferential groove 49 milled in selected wheel 21 around the entire surface engaging outer circumference thereof. Band 19 has dimensions selected so that when applied to wheel 21 (preferably by stretching the band over the wheel and then into the groove, although gluing, direct molding systems, and the like could be utilized) the diameter of wheel 21 is preferably greater overall than the diameter of the remaining wheels (preferably for example at least by 0.10 inch). Groove 49 is milled to a selected width (preferably corresponding to the width of pad 17) and depth, for example, between 0.10 inch to 0.50 inch deep, and band 49 has an overall width to thereby effect the desired greater diameter (for example, between 0.20 inch and 0.60 inch). It should be realized, that for wheeled apparatus having different load bearing capacities, the size of the groove and band would be adjusted.

It has been found that when applied to skates such as those illustrated in FIGS. 1 and 2, that given an average weight user, a 0.050 compression of the band can be expected between the wheel and the surface over which the skate travels, thereby offering excellent stopping power when light pressure is applied to band 19 by brake pad 17. Since pad 17 and band 19 are both subject to wear, each may be easily replaced in the assembly. Placement of the band and adjacent pad at the middle wheel of a linearly arranged set of wheels in a skate provides excellent control and thus enhanced safety to the user of such skates (such skates being notoriously difficult to stop within a reasonable distance).

Brake pad 17 (formed, for example, from rubber or rubber-like material similar to that used in band 19, asbestos, metal, synthetics and/or alloys known to those skilled in the art) is held (for example by gluing or compression fit) on bracket 51 above wheel 21 and below footwear 27 and support structure 29. Bracket 51 is pivotably mounted at mounting plates 15 on pin 53. Bracket 51 is operatively connected with lever 55 connectable with actuator 25 (for example utilizing mechanical means such as cable 57, although any actuating means, including electronic means, hydraulic means, and the like, could be utilized). Pin 53 has spacers 59 thereover to position bracket 51, and thus pad 17 adjacent to band 19. Bracket 51 is held in contact with pin 53 (for example utilizing set screw 61) for common rotation thereof. Return spring 63 is attached at one end thereof to pin 53 and at the other end thereof at mounting plate 15 to aid return of pin 53, bracket 51 and, thus, pad 17 from a position contacting band 19 upon activation of actuator 25, to a position spaced from band 19 for continued free rotation of wheel 21. Set screw 65 holds lever 55 in contact with pin 53 for common rotation thereof.

Any suitable means for attaching mounting assembly 13 to the wheeled apparatus may be utilized. However, for use with skates of the type shown in FIGS. 1 and 2, it has been found to be especially advantageous to utilize mounting brackets 15 together with pin 53. Such skates typically have a cutaway portion of wheel framework 31 where mounting assembly 13 is shown to be maintained in FIG. 1. Thus, by providing pin head 67 adjacent to one of the plates 15 and spring 63 adjacent to the others of the plates 15, mounting assembly 13 is effectively secured (by clamping) to wheel framework 31 without direct attachment thereto.

Cable 57, in cable jacket 69, is held by bracket 71 attached to mounting plate 15 (for example utilizing screws or the like). The other end of cable 57 is connected with hand held actuator 25 at movable grip 73 rotatably mounted on pin 75 within outer grip assembly 77 including grip 79.

The brake assembly heretofore described may be supplied either as original equipment with the particular wheeled assembly to which it is applied, or may be usefully provided in kit, or other form, for retrofitting to the particular wheeled assembly (the kit optionally including a replacement wheel for selected wheel 21 having band 19 already mounted thereon, or merely including instructions for milling of the selected wheel to accommodate band 19).

Turning now to FIGS. 8 through 12, second, and now preferred, embodiment 85 of the brake assembly is shown, as before, mounted to an in-line skate including footwear unit 87, and support structure 89 including a framework, or truck, 91 having a plurality of wheels 93, 95, 97 and 99 mounted thereto on axles 101, 103, 105 and 107, respectively.

Wheel 95 may include the groove and band structure heretofore described, or, may be constructed of material similar to the other wheels, such as urethane, with wheel 95 preferably being more resilient (i.e., having a lesser durometer). In either case, it is preferable for wheel 95 to either have a greater diameter than the other wheels or to be adjustable in truck 91 so that wheel 95 extends below (that is more toward the surface to be engaged by the wheels) the plane defined by the lower surfaces of the other wheels to thus accommodate more responsiveness of the skate to braking.

In the latter case (the case of adjusting the wheel), axle guides 109 are provided in apertures 111 at both sides of truck 91, apertures 111 being elongated, and axle guides 109 having an off center aperture 113 therein. In this fashion, wheel 95 may be adjusted relative to the other wheels by orienting guide 109 in aperture 111 with aperture 113 toward the bottom of the guide relative to the surface over which the skate will move. Guide 109 can be configured to have a plurality of apertures for maintaining axle 103 therethrough, thus refining the ability of a user to determine the relative position of wheel 95 (for example allowing periodic readjustment of the position of the wheel to accommodate for wear of the surface engaging part of wheel 95).

The braking assembly again includes a hand activated actuator 117 (which functions in most regards as the actuator heretofore set forth, but which could be other kinds of actuators such as electronic actuators or actuators activated by other means). The hand held actuator is operatively connected by sheathed cable 119 to actuating lever arm 121 of the braking assembly. The cable sheath is anchored by any conventional mechanism to truck 91 (for example using anchor 123).

Activating lever arm 121 is maintained around axle 103, with the position thereof being in part established by mount 125. As shown in FIG. 12, lever arm 121 includes an indented face 127, having a shape corresponding to the upper portions of mount 125, and aperture 129 through which axle guide and rotation limiting structure 131 is positioned. Beveled indentations 133 and 135 are formed in face 127, the beveled indentations operating as seats for nodules 137 and 139 of mount 125, with the nodules operating as camming surfaces, as will be set forth hereinafter.

Mount 125 includes lip 141 at the lower portion thereof, lip 141 being maintained adjacent to bottom surface 143 of truck 91, so that, in combination with axle guide structure 131 and axle 103, mount 125 is maintained in a substantially constant position (again without direct attachment thereof to truck 91). Brake pad 145 (preferably formed of a rubber compound, for example typical tire rubber) is movably mounted on rotation limiting structure 131 of mount 125, with brake pad 145 being movable longitudinally along structure 131, but being prevented from rotation by the angular orientation of structure 131 and aperture 147. Braking surface 149 of brake pad 145 is formed by the beveled outer circumference of pad 145 so that surface 149 is oriented neither perpendicular nor parallel to the axis of rotation of wheel 95 (preferably at about a 45° angle relative to the axis rotation).

Wheel 95 is formed by wheel halves 151 and 153 (though unitary construction could be provided) connected, for example, by screws 155. Wheel halves 151 and 153 maintain surface engaging material band 155 in association therewith, with groove 157 defined when the wheel halves are engaged gripping annular ridge 159 of material band 155. In the case illustrated in FIG. 11, an additional material band 161 is provided in groove 163 which functions in the same way as set forth heretofore with respect to band 19.

While not specifically discussed herein, wheel halves 151 and 153 include appropriate bearing surfaces for assuring ease of rotation of wheel 95 on axle 103.

Wheel half 153 has pad engaging structure 165 connected at an inner annular face 167 thereof, pad engaging structure 165 having braking surface 169 which is matable with braking surface 149 of pad 145, and is thus oriented at a similar angle as surface 149.

By thus orienting the matable, peripheral contact surfaces of pad 145 and pad engaging structure 165, the available braking surface area of each is maximized relative to the space at the inner part of wheel half 153 for providing such braking surfaces.

Engaging structure 165 is connected in wheel half 153, for example by screwing, gluing or the like, and is preferably formed of a linen filled phenolic which provides an excellent braking surface, dissipates heat very quickly, and works well in association with the tire rubber forming brake pad 145.

Biasing spring 171 is maintained between inner annular face 167 of wheel half 153 and brake pad 145 (adjacent to washer 173 maintained in depression 175 of brake pad 145).

As may be appreciated, the entire assembly can be mounted on an existing in-line skate, or other such wheeled devices or apparatus, with virtually no special preparation of existing apparatus structure.

In operation, actuation of actuator 117 retracts cable 119, thus rotating lever arm 121 about axle 103. As lever arm 121 is rotated, beveled portions 133 and 135 bear against nodules 137 and 139, respectively (only two pair of each being shown, it being understood that other structure could accommodate similar functions with more cam and seat surfaces). Since mount 125 is substantially immovable, the relative movement of faces 127 and 177 of lever arm 121 and mount 125, respectively, and thus of beveled portions 133/135 and nodules 137/139, force lever arm 121 inward and against brake pad 145 thus moving brake pad 145 on structure 131 toward pad engaging structure 165, until braking surfaces 149 and 169 are brought into contact, thus exerting stopping forces on wheel 95. When hand held actuator 175 is released, arm 121 returns to its original position with spring 171 forcing brake pad 145 back to its resting position spaced from structure surface 169, and with nodules 137 and 139 again seated in beveled structures 133 and 135.

As may therefore be appreciated, an improved braking assembly and method, marked by compact arrangement and improved stability and response time, is provided for wheeled apparatus including skates.

What is claimed is:

1. A braking assembly for an in-line skating apparatus having in excess of two surface contacting wheels arranged in a rectilinear row, each wheel having a central bore extending from an annular face of each wheel and being rotatably connected with a support structure through the central bore, said braking assembly comprising:

a brake member mounted adjacent to a middle one of the wheels and including an activating arm adjacent to the support structure and a pad movable with said activating arm;

a pad contacting structure connectable to said middle one the wheels at the annular face thereof; and actuating means operatively associated with said activating arm of said brake member for selectively causing movement of said activating arm and said pad to bring said pad into contact with said pad contacting structure.

2. The assembly of claim 1 wherein each of the wheels is rotatably connected by an axle with the support structure, and wherein said activating arm is mounted on the axle of said middle one of the wheels and is rotatable by said actuating means to cause contact between said pad and said pad contacting structure.

3. The assembly of claim 2 wherein said pad and said contacting structure include matable peripheral contact surfaces oriented neither parallel nor perpendicular to the axis of rotation of said middle one of said wheels.

4. The assembly of claim 2 further comprising a seat structure positioned at one of the support structure and said activating arm, and a camming surface positioned at the other of the support structure and said activating arm, with said camming surface being in registration with said seat structure when no braking is being applied, and with said seat structure and said camming surface being brought out of registration by rotation of said activating arm to effect movement of said pad toward said pad contacting structure.

5. The assembly of claim 1 wherein said actuating means includes a hand activated actuator.

6. A wheeled skating apparatus comprising:

a support structure;

at least three wheels, each wheel being rotatably connected with said support structure so that said wheels are arranged in a rectilinear row;

a mount securable between said support structure and a middle one of said wheels;

an activating arm positioned between said mount and said one of said wheels;

a brake pad movable with said activating arm;

a pad contacting structure connected to a central part of said one of said wheels; and actuating means connected to said activating arm for selectively causing said brake pad to contact said contacting structure.

7. The apparatus of claim 6 wherein said support structure includes a wheel framework having said wheels connected therewith and an article of footwear connected to said framework.

8. The apparatus of claim 6 wherein said activating arm and said mount have opposed faces different ones of which have a camming surface and a seat structure so that said activating arm moves away from said mount to cause contact of said brake pad with said pad contacting structure upon activation of said actuating means.

9. The apparatus of claim 6 wherein said mount includes means for securing said mount to said support structure without direct attachment thereto.

10. The apparatus of claim 6 wherein said one of said wheels has a circumferential groove formed at an outer circumference thereof, said apparatus including a relatively resilient material band positioned in said groove, said band having dimensions selected so that said diameter of said one of said wheels together with said band is greater than said diameter of any one of said wheels without said band.

11. The apparatus of claim 6 wherein said brake pad has a conical braking surface.

12. The apparatus of claim 11 further comprising means for selectively adjusting the position of said one of said wheels relative to another of said wheels.

13. A method for providing braking of an in-line skating apparatus having at least three wheels arranged in a rectilinear row, each wheel being rotatably connected with a support structure through a central bore in each of the wheels, said method comprising the steps of:

mounting an activating arm adjacent to a middle one of the wheels;

mounting a brake pad with said activating arm;

mounting a pad contacting structure to an inner part of said middle one of the wheels; and operatively associating actuating means with said activating arm for selectively causing contact between said pad and said contacting structure when said activating arm is caused to move by said actuating means.

14. The method of claim 13 further comprising positioning a relatively resilient material band at a circumferential outer part of said middle one of the wheels, said band being resilient relative to a surface contacting material of any other of the wheels.

15. The method of claim 13 wherein said middle one of the wheels includes an annular face at said inner part thereof and wherein said pad contacting structure is mounted to said annular face.

16. The method of claim 13 wherein the step of mounting said activating arm further comprises mounting said activating arm between the support structure and said middle one of the wheels.

17. The method of claim 13 further comprising providing for selective adjustment of the position of said middle one of the wheels relative to others of the wheels.

18. The method of claim 13 wherein the step of operatively associating actuating means with said brake pad includes providing a hand activated actuator.

* * * * *